United States Patent [19]

Filas et al.

[11] Patent Number: 5,380,559
[45] Date of Patent: Jan. 10, 1995

[54] ELECTROLESS METALLIZATION OF OPTICAL FIBER FOR HERMETIC PACKAGING

[75] Inventors: Robert W. Filas, Bridgewater; Constance A. Jankoski, Branchburg, both of N.J.

[73] Assignee: AT&T Corp., Murray Hill, N.J.

[21] Appl. No.: 54,921

[22] Filed: Apr. 30, 1993

[51] Int. Cl.$^6$ .............................................. B05D 1/00
[52] U.S. Cl. ................................ 427/305; 427/304; 427/443.1
[58] Field of Search ....................... 427/305, 443.1, 304

[56] References Cited

U.S. PATENT DOCUMENTS

| | | | |
|---|---|---|---|
| 3,969,554 | 7/1976 | Zeblisky | 427/305 |
| 4,122,215 | 10/1978 | Vratny | 427/305 |
| 4,125,648 | 11/1978 | Vratny | 427/305 |
| 4,150,171 | 4/1979 | Feldstein | 427/305 |
| 4,154,877 | 5/1979 | Vratny | 427/443.1 |
| 4,368,221 | 1/1983 | Stefán | 427/443.1 |
| 4,368,223 | 1/1983 | Kabayashi | 427/305 |
| 4,512,829 | 4/1985 | Ohta et al. | 156/659.1 |
| 4,592,932 | 6/1986 | Biswas | 427/163 |
| 4,609,437 | 9/1986 | Kruishoop | 205/138 |
| 4,639,380 | 1/1987 | Amelio | 427/304 |
| 4,668,925 | 5/1987 | Towartari et al. | 333/219 |
| 4,759,950 | 7/1988 | Stevens | 427/252 |

OTHER PUBLICATIONS

F. A. Lowenheim, "19 Plating on Nonconductors", Electroplating McGraw-Hill Book Company, New York etc., 1978, pp. 416–425.

H. Honma and K. Kanemitsu, "Electroless Nickel Plating On Alumina Ceramics", Plating and Surface Finishing, Sep., 1987, pp. 62–67.

W. Riedel, "Electroless Nickel Plating", 3.3 Hypophosphite Baths, ASM International Metals Park, Ohio, 1991 pp. 17–20.

Primary Examiner—Shrive Beck
Assistant Examiner—Vi Duong Dang
Attorney, Agent, or Firm—Oleg E. Alber

[57] ABSTRACT

An electroless process has been developed to deposit nickel and gold onto optical fibers using aqueous chemistry. The key to the process is a sensitization of a surface of an optical fiber using a dilute aqueous stannous fluoride solution in absence of oxygen. Stannous fluoride solution is prepared by dissolving crystalline $SnF_2$ in deionized water. Subsequent treatment includes immersion of sensitized optical fiber in a palladium chloride/HCl aqueous solution and commercially available electroless nickel and electroless gold solutions. The process is compatible with either chemical or fusion lensing operations by using a strippable polymer coating to selectively metallize near the fiber end. The solder joints to the metallized fiber are hermetic as determined by helium leak testing, and solder pull-test strengths typically range from 3–5 pounds, depending on the type of solder. This electroless plating process for metallizing optical fibers makes feasible the incorporation of soldered fiber into packages which might be otherwise prohibitively expensive or mechanically infeasible with the sputtered metallization. The process is useful for all lightwave components which require either hermeticity or high reliability optical fiber attachment.

8 Claims, 2 Drawing Sheets

5,380,559

ELECTROLESS METALLIZATION OF OPTICAL FIBER FOR HERMETIC PACKAGING

FIELD OF THE INVENTION

This invention concerns formation of metallizations on optical fibers by electroless plating.

BACKGROUND OF THE INVENTION

In fiber-optic technology many applications require an ability to solder to an optical fiber, either for alignment to such optical devices as lasers and photodetectors or in hermetic packaging. One currently employed technique to accomplish this task is to sputter metal onto the fiber. Sputtered metallizations on fibers, such as titanium, platinum and gold metallizations, are being used in submarine and terrestrial lightwave as well as in cable TV projects. This approach is not only expensive but also produces a non-uniform coating, tends to weaken the fiber, and puts limitations on the type of polymer jacketing that can be used in the vacuum of the sputtering chamber. Other approaches to hermetic bonding to fibers require high-temperature processing, such as the Englehard platinum ink process (670° C.), or a low-melting glass made by Schott Fiber Optics (480° C.). A process for depositing metal on optical fibers at low temperature and without the need for a high-vacuum operation would be more technically and economically advantageous. One technology has been used in the past to metallize such dielectric surfaces as glass by an electroless deposition of nickel. A glass surface is prepared for the electroless deposition of nickel by applying onto the surface a sensitizer which acts to deposit a catalyst for the nickel reduction from an electroless nickel plating solution. For example, an aqueous solution of stannous chloride ($SnCl_2$) applied to a glass surface, such as a microscope slide, will coat the surface with $Sn^{2+}$ ions. When this sensitized surface is exposed to a solution of $Pd^{2+}$ ions, an oxidation reduction reaction occurs in which the tin ion is oxidized to $Sn^{4+}$ and the palladium ion is reduced to palladium metal ($Pd^0$). When this activated surface is subsequently exposed to a solution of $Ni^{2+}$ and a reducing agent, such as sodium hypophosphite, the palladium ($Pd^0$) catalyzes the reduction of nickel ion to nickel metal ($Ni^0$), which is itself a catalyst for its own reduction.

Unfortunately, although $SnCl_2$ works adequately as a sensitizer for glass surfaces, it has not been possible to obtain reproducible, uniform plating of nickel on silica fibers using this standard approach. Thus, a reliable process for the electroless metallization of optical fibers is needed.

FIELD OF THE INVENTION

This invention embodies an electroless process for depositing nickel and gold in succession onto optical fibers using aqueous chemistry. The key to the process is a sensitization of a surface of an optical fiber in the absence of oxygen using a dilute aqueous stannous fluoride solution prepared by dissolving crystalline $SnF_2$ in deionized water. Subsequent treatment includes immersion of the sensitized optical fiber in an aqueous solution of palladium chloride/HCl followed by electroless plating from commercially available electroless nickel and electroless gold solutions. The process is compatible with either chemical or fusion lensing operations by using a strippable polymer coating to selectively mask portions of the fiber surface of the fiber end. Solder joints to the metallized fiber are hermetic as determined by helium leak testing and solder pull-test strengths typically range from 3-5 pounds, depending on the type of solder.

DETAILED DESCRIPTION

This invention embodies a simple, reproducible electroless process for the selective metallization of optical fibers. The fiber strength with this metallization thereon is superior to that of the currently employed product using sputtered Ti/Pt/Au. The invention is a process of providing optical fibers with metallizations suitable for solder bonding the fibers to other surfaces. The process includes the steps of immersing bare portions of an optical fiber to be metallized into a solution of from 0.5 to 3 g/L, preferably 1 g/L $SnF_2$, in deionized water, rinsing in water, immersing the sensitized portion into an aqueous activating solution of from 2 g/L to 10 g/L, preferably 6 g/L $PdCl_2$ in dilute HCl (from greater than 0.01 M to less than 0.1 M, preferably 0.02 M HCl) with pH of this solution ranging from 1.6 to 1.7, rinsing in water, immersing the activated portion in an electroless nickel plating bath for a period sufficient to produce a from 1 to 20 μm, preferably 3–5 μm thick layer of nickel, and rinsing in water. The $SnF_2$ solution, an intermediate rinsing bath, and the $PdCl_2$/HCl solutions are kept in a non-oxidizing ambient, such as nitrogen atmosphere. The process optionally includes formation of a thin protective layer of metal such as gold on the nickel layer. The gold layer is formed by immersing the nickel-plated portion into an electroless gold plating bath for a period sufficient to produce a from 0.1 to 1 μm, preferably 0.7 μm thick gold layer on the nickel layer, and rinsing the gold-plated fiber in water.

The metallization may be conducted by treating each fiber individually or by securing a plurality of fibers with end portions bared of the polymeric jacket in holders which are moved in succession from one container, containing a proper solution or rinsing water, to another. The fibers are so positioned in the holders that only a desired length of each end portion is immersed in the treatment solution which only minimally overlaps the end of the polymer jacket.

Figure 1:
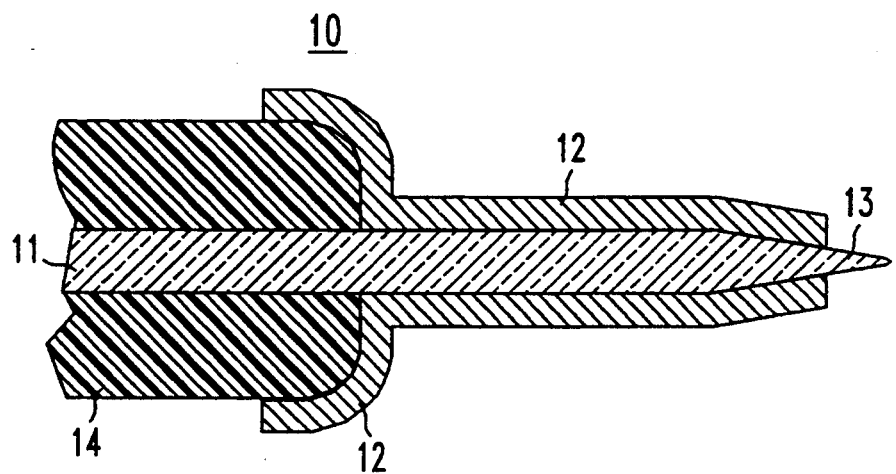
FIG. 1 is a schematic representation of an optical fiber, a portion of which is metallized according to the invention.

Shown in FIG. 1 is a schematic representation of a metallized optical fiber, 10, with a fiber, 11, a metallization, 12, non-metallized end portion, 13, and a polymer jacket, 14.

The optical fiber in the exemplary embodiment was a submarine lightguide (SL) single-mode fiber with a urethane-acrylate polymer jacket. The first step in the process is the removal of the urethane-acrylate polymer jacket from a preselected length of the fiber. The polymer jacket is easily dissolved (decomposed) by immersion in hot concentrated sulfuric acid. The time of removal varies with the temperature of the acid but is typically about 5 seconds at 160° C. To insure complete removal of the polymer jacket, the fibers may be left in the acid for 15 seconds. Longer time in the acid will not harm the fiber, but the end of the remaining polymer jacket in the meniscus of the acid becomes partially hydrolyzed and thus more hydrophilic. The result of this hydrophilic region is that the polymer jacket becomes highly swollen in water. Although the water can be removed by drying, it is advisable to limit the stripping time in the acid to only what is necessary to clean the surface to be metallized. The fibers are then rinsed in water by dipping for a few minutes in water.

Once stripped, the bare portions of the fibers are treated with a 1 g/L ($6.4 \times 10^{-3}$ M) solution of stannous fluoride by immersion for 5-10 minutes under nitrogen with gentle stirring. Adhesion of the stannous fluoride to the surface of the optical fiber occurs without any physical abrasion of the fiber surface. A 1 g/L solution of stannous fluoride was prepared as follows: After deoxygenating 300 ml of 18 Ω water with bubbling nitrogen from a gas diffusion tube for 30-45 minutes in a nitrogen box, 300 mg of crystalline $SnF_2$ was added and stirred for about three minutes to form a clear, colorless solution which may be used immediately for up to two hours or until any turbidity is observed. $SnF_2$, a tin (II) fluoride, obtainable in crystalline form from Sigma Chemical Co., Catalogue No. $2887, was used without further purification. This $SnF_2$ solution was stored under nitrogen prior to use. The deionized water (DI) was prepared by passing tap water through a Barnstead NANO Pure II ® filter unit.

$SnF_2$ is not indefinitely stable in water and is susceptible to air oxidation. On standing in ambient atmosphere, a colloid develops and the particle size of this colloid grows rapidly with an increase in the concentration of $SnF_2$. Although the presence of the colloid does not prevent plating from occurring, some particles of colloid adsorb onto the fiber surface and cause a bumpy surface appearance. The existence of these bumps may be benign; however, these sites are potentially a source of failure of the metal-silica interface. From a practical perspective, it is more prudent to avoid conditions which form this colloid. Keeping the aqueous $SnF_2$ solution under nitrogen greatly reduces the formation of the colloid. Furthermore, if the concentration of $SnF_2$ is kept to 1 g/L or less and oxygen is excluded, no appreciable colloid develops for a few hours.

The sensitized fibers are then rinsed by dipping in DI water once, and put into an activating solution with 6 g/L of palladium chloride ($3.4 \times 10^{-2}$ M) and 0.02 M HCl in water for 1 minute with gentle stirring. A 6 g/L solution of palladium chloride in 0.02 M HCl was prepared by adding 1.8 g $PdCl_2$ to 300 ml of stirred acid and heating to 60-70° C. for about 30 minutes, then cooling to room temperature and filtering the resultant dark yellow-brown solution using a Nalgene MediaPlus filter unit. The pH of the solution was about 1.65. $PdCl_2$ was a 99.9 percent palladium (II) chloride obtainable from Johnson Mathey, Catalogue No.. 11034, which was used without further purification. The hydrochloric acid was 0.1 M, obtainable from Aldrich, Catalogue No. 31,896-5, which was diluted with DI water to the desired concentration. The solution is not air sensitive, but it was also kept in the nitrogen box along with the $SnF_2$ solution to avoid oxidation of the $SnF_2$ layer in air during the transfer from the rinsing bath to the $PdCl_2$/HCl bath. Magnetic stirrers under the nitrogen box were used to gently stir both the $SnF_2$ and $PdCl_2$ solutions.

In order to optimize the conditions for sensitizing the fiber surface, the effect of the concentration of both the $PdCl_2$ and the HCl were investigated. It was found that the higher the $PdCl_2$ concentration the better, but that the HCl concentration should be kept as low as possible while still maintaining the solubility of the $PdCl_2$. Solutions of $PdCl_2$ may be prepared with content of Pd ranging from 2 g/L to 10 g/L, with 6 g/L being optimum. Since the $SnF_2$ on the fiber surface is susceptible to oxidation or desorption once it is transferred to the $PdCl_2$ bath, there is a competition between these unwanted processes and the desired redox reaction. From this standpoint, a high $PdCl_2$ concentration is deskable. At a concentration of 6 g/L $PdCl_2$ and between 0.02 and 0.05 M HCl, good nickel plating takes place, but at 0.1 M HCl only partial plating occurred. In the event that $Cl^{-1}$ could possibly exchange with $F^{-1}$ on the surface-bound stannous species before the palladium(II) could be converted to Pd(0), the amount of HCl used with the $PdCl_2$ should be minimized by keeping it close to the concentration at which it would not be possible to dissolve all of the $PdCl_2$. For example, the concentration of 0.01 M HCl, would be insufficient, but 0.02 M HCl would be recommended.

The process up to this point was carded out under nitrogen due to the sensitivity of the stannous fluoride to oxygen. After removing the fibers from the palladium chloride solution, the fibers are again rinsed in water. At this stage, the fibers have a catalytic layer of palladium on them and are no longer sensitive to oxygen so that the fibers may be removed from the protective nitrogen atmosphere.

At this time the end of the polymer jacket is partially swollen with water, and must be dried prior to the immersion of the fiber in the electroless nickel bath to ensure a smooth interfacial metal coating. Drying can be done in a forced air oven for about 10 minutes at 75° C. Longer drying times up to a day do not deactivate the catalytic surface, but could potentially be disadvantageous due to particulates in the air.

Figure 2:
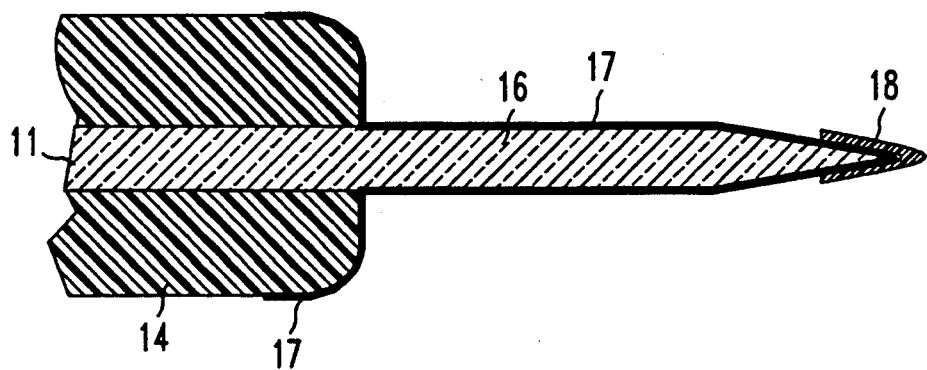
FIG. 2 is a schematic representation of an optical fiber, a portion of which has a thin coating of catalytic metal thereon and, optionally, a protective polymer coating at end portion of the fiber.

In order to avoid metal plating on the end of the fiber, such as on a cleaved end surface of the fiber or on an end of the fiber that has been or needs to be lensed, the end can be protected by means of a strippable polymer. The strippable polymer is applied on the fiber end after the deposition of a thin coating, 17, of $SnF_2$/Pd on the bare fiber. This is accomplished by dipping the fiber end in a solution of an easily strippable polymer to coat the region which is to remain free of plated metal. Presence of the strippable polymer on the fiber prior to the application of coating 17 could lead to the formation of the $SnF_2$/Pd coating on this polymer and eventual deposition of a plated metal on it, which is to be avoided. Shown in FIG. 2 is optical fiber 10 with polymer jacket 14, a bared portion 16 of fiber 11, thin coating, 17, of $SnF_2$/Pd thereon and a strippable polymer, 18, on a tapered end of the fiber. A strippable polymer coating solution is composed of a solution of KEL-F 800 resin ®, obtainable from 3M Corporation, in amyl acetate. These polymer coatings were applied to the ends of fibers by dipping them into a 30-35 weight percent solution of the KEL-F 800 resin ® in amyl acetate. Drying of the coating was done in a forced air oven at 75° C. for about 10 minutes; however may be conducted in forced air at ambient conditions until dry. The polymer is removable from the fiber ends by rinsing in stirred acetone for about a minute.

After drying the water-swollen polymer jacket end and applying, as needed, any protective polymer coating on the fibers, the fiber is transferred to an electroless nickel bath. The electroless nickel plating solution was a commercially obtainable solution provided as two separate pans, part A and pan B, which are to be combined prior to the use. Part A is a source of nickel ions, such as nickel chloride, nickel sulphate and nickel acetate, and pan B is a source of hypophosphite ions (a reducing agent) such as sodium hypophosphite. One type of nickel plating solution is obtainable from Fidelity Chemical Products Corporation, Newark, New Jersey, as type 4865 in which part A contains nickel sulfate and pan B contains sodium hypophosphite, sodium hydroxide and acetic acid. The nickel solution is prepared by combining part A, part B, and water, the solution having pH ranging from 4.5 to 5.2. The nickel solution for use in this metallization process was prepared by combining pan A, part B and 18 MΩ water in the ratio 1:3:16, then filtering using the Halgne Media-Plus filter unit (nylon 0.2 micrometer pores). The pH of this solution was about 4.85.

The nickel plating solution was used at $85\pm°$ C. No stirring was used and none is recommended. Good temperature control is important, since spontaneous plating of nickel on the walls of the plating container can occur at higher temperatures, while the rate of nickel plating decreases rapidly at lower temperatures. A temperature gradient greater than 1 to 2° C, e.g. up to 10° C. or greater, between the bottom and the top of the plating container would cause spontaneous nickel plating. The autocatalytic nature of the nickel plating can cause rapid accumulation of nickel and evolution of hydrogen. Small particles of nickel are carried by the convection from these hydrogen bubbles and can adhere to the fiber surface interfering with the plating deposition. Good temperature control is obtainable by immersing the container with the nickel solution in water in a larger container with a stir bar in a fluoroware cage under the nickel solution container. The water bath around the nickel solution container permits close control of the temperature gradient so that the solution could be maintained at the proper temperature. With this procedure, very little if any spontaneous nickel plating was observed after six hours.

Figure 3:
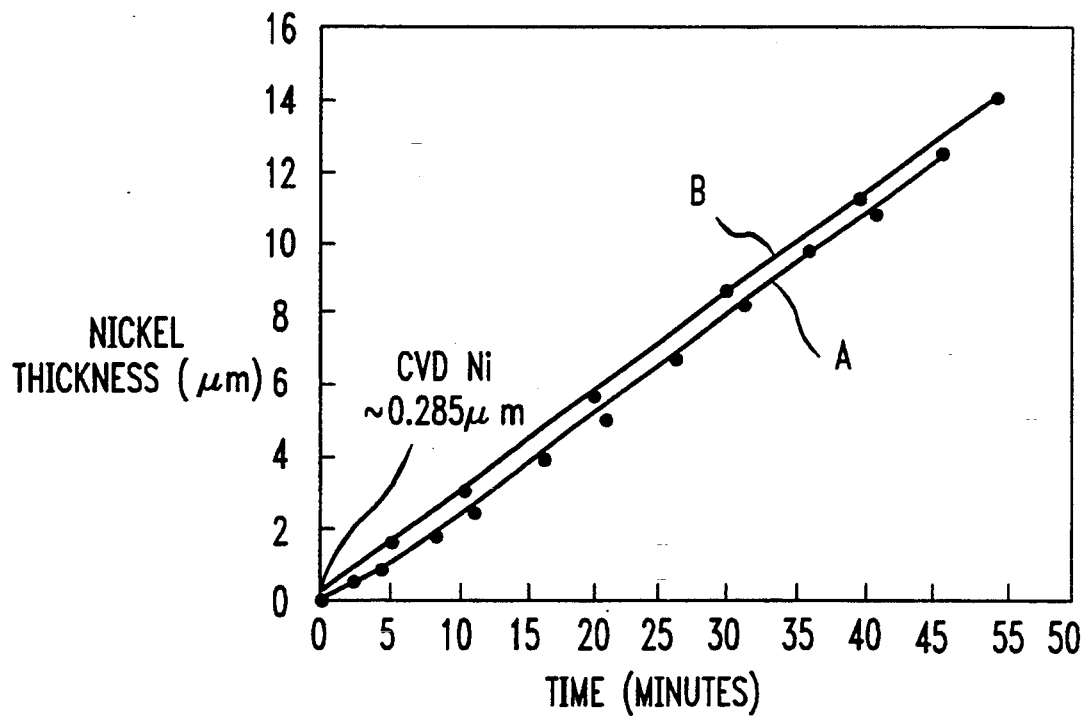
FIG. 3 is a plot of nickel plating thickness versus plating time on the fiber with a $SnF_2$/Pd base and with a CVD nickel base.

The nickel thickness is proportional to the time in the bath after a brief induction period as shown by curve A in FIG. 3. The nonlinearity in the curve at the beginning of the plating is probably due to the growth of nickel both parallel and perpendicular to the fiber surface around palladium atoms. Once there is a uniform base of nickel then the growth is only unidirectional and the thickness becomes directly proportional to time. For comparison, the thickness of electroless nickel grown on a base of chemical vapor deposited (CVD) nickel is represented by curve B in FIG. 3. In the latter case the thickness varies linearly with time with the same deposition rate (about 0.275 $\mu$m/minute), but without any induction period and extrapolates to the CVD nickel thickness (ca. 0.25–0.285$\mu$m) at time=0. A nickel thickness of about 3 micrometers is sufficient for soldering with 3 percent silver—97 percent tin solder, which has the largest solubility of nickel of the solders most commonly employed. Therefore, 20 minutes in the nickel bath to give about 5 $\mu$m of nickel deposit would be a conservative compromise for all potential solders. Whenever part B of the nickel solution includes hypophosphite ion ($H_2POhd\ 2^{-1}$) as the reducing agent, phosphorous is deposited at the catalytic surface and is incorporated into the nickel to form a nickel-phosphorous alloy. The nickel deposit from the above solution included phosphorous in an amount of from 7 to 10 weight percent.

After rinsing the nickel-plated fibers by dipping once in water, the fibers are immersed into the electroless gold bath with a pH of about 5.72 at about 70° C. Immersion in the gold bath for 10 minutes with gentle stirring gives a gold deposit about 0.18 $\mu$m thick. The gold-plated fibers are then rinsed by dipping in water. The commercially obtainable electroless gold-plating solution was filtered prior to the use by means of the Halgne Media-Plus filter unit. Electroless gold solution is obtainable from Technic Inc., Cranston, Rhode Island, as Oromense "N" ®, as a 0.125 troy ounce gold per quart of solution with pH ranging from 5.0 to 6.0.

At this time, the end of the polymer jacket is again partially swollen due to the immersion into aqueous nickel and gold solutions and should be dried. Drying is done in a forced air oven for about 10 minutes at 75° C. Ambient drying is also possible, but consumes undue length of drying time.

After the gold plating, rinsing and drying steps, any strippable polymer coating, e.g., 18, FIG. 2, on the fiber ends is removed by immersing the ends in stirred acetone.

A specific example of a flow chart of an embodiment of the above process may be summarized as follows:

(a) a container with an aqueous $SnF_2$ bath, a container with DI rinse water, and a container with an aqueous $PdCl_2$ and HCl bath are placed under nitrogen atmosphere;

(b) the polymer jacket is removed from a preselected length of the fiber by immersion into a hot (160° C.) concentrated sulfuric acid for a period of from 5 to 15 seconds, followed by rinsing in water for a few minutes;

(c) the bared fiber is immersed into an aqueous sensitizing solution containing 1 g/L of $SnF_2$ at room temperature for a period of from 5—10 minutes, followed by at least one rinse in the DI water;

(d) the sensitized fiber, while still under nitrogen atmosphere, is immersed into an aqueous activating solution containing 6 g/L of $PdCL_2$ and 0.02 M HCl at room temperature for a period of about one minute, followed by at least two rinses in DI water;

(e) the activated fiber including at least an adjacent portion of the polymer jacket and a protective coating, if any, is dried in moving air at 75° C. for a period of about five to ten minutes;

(f) optionally, an end of the dried fiber is dipped into a strippable polymer to provide a coating protective against the metallization of the end of the fiber, and is dried in moving air at 75° C. for a period of from five to ten minutes;

(g) the activated fiber is immersed for a period of about 20 minutes into an electroless nickel solution kept without stirring at $85\pm1°$ C. followed by rinsing in DI water;

(h) the nickel-coated fiber is immersed for a period of about 10 minutes into an electroless gold plating solution kept with stirring at about 70° C., followed by rinsing in DI water;

(i) if needed, the end of the polymer jacket is dried in a moving air at about 75° C. for a period of about 10 minutes; and (j) the strippable protective coating, if present, is removed by immersion in a suitable solvent.

Metal thicknesses were determined from SEM micrographs of cross sections of the metallized fibers. The thickness of the metal coating was determined by direct measurement from the micrographs. The fibers were cleaved using a York® fiber cleaver and the micrographs were taken using a JOEL 840 SEM ™. The need for coating the samples was avoided by restricting accelerating voltages to 3-4 KV.

SEM micrographs showed an initial grain size of the Ni-P alloy to be on the order of 0.1-0.2 gm when the metal is about 0.4 $\mu$m thick and to increase to 0.15-0.35 $\mu$m at a metal thickness of 0.9 $\mu$m and to 0.25-0.5 $\mu$m for a metal thickness of 12.5 $\mu$m. In comparison, the grain size of a CVD nickel film (0.2 $\mu$m thick) is on the order of 0.05-0.1 $\mu$m. When electroless nickel as Ni-P alloy was deposited on a CVD nickel base, the same coarsening of the grain size was observed with increasing metal thickness, indicating that the coarsening of the morphology with metal thickness is a property of the growth process in the plating bath rather than on the nature of the substrate.

Figure 4:
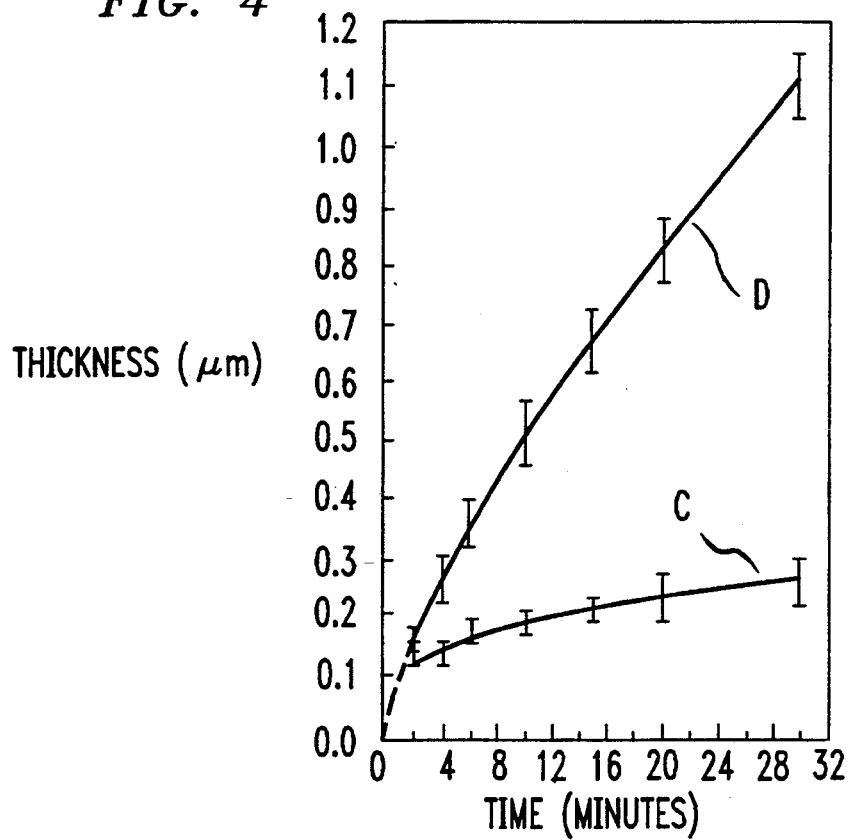
FIG. 4 is a plot of electroless gold thickness versus plating time deposited on top of electroless nickel plating.

SEM analysis was also performed on the cross section of fractured fibers which had been treated for various times in the electroless gold bath. Close examination of an enlargement of the gold layer on top of a thick base of electroless nickel, revealed that the gold layer is actually composed of two regions: an upper structureless region and a lower "columnar" region. The thicknesses of these two regions is plotted in FIG. 4 as a function of time in the electroless gold bath. The upper region (plot C), which included primarily Au, is found to approach a saturation value of about 0.2 $\mu$m but the lower "columnar" region (plot D), which included both Au and Ni, increases with time in the bath. Since the purpose of the gold is only to protect the nickel before soldering, an electroless gold plating treatment time of 10 minutes would be sufficient for a deposit including about 0.18 $\mu$m Au and 0.5 $\mu$m Au-Ni.

Solder pull strengths and hermeticity tests of plated fibers indicate hermetic solder joints (based on helium leak tests to about $10^{-9}$ atm cm$^3$/sec) even after temperature cycling, and pull strengths which vary with the solder used but are typically in the range 2.5-3.5 pounds for 80% Au/20%Sn solder and 3-5 pounds for 3%Ag/97%Sn solder. The variation in pull strengths with solder composition is probably related to the maleability of the solder. For example, the Au/Sn solder used in high reliability products, such as a submarine lightguide (SL) cable, was selected for its rigidity but is also likely to develop higher stress concentration at the edge of the solder joint.

Additional advantages and modifications will readily occur to those skilled in the art. Therefore, the invention in its broader aspects is not limited to the specific details, representative devices, and illustrated examples shown and described. Accordingly, various modifications may be made without departing from the spirit or scope of the general inventive concept as defined by the appended claims and their equivalents.

We claim:

1. A method of metallizing an optical fiber having a silica containing surface, which comprises:

treating a bare surface of a section of an optical fiber in absence of oxygen with a dilute aqueous sensitizing solution of SnF$_2$ so as to deposit Sn$^{2+}$ ions on the bare surface, said sensitizing solution consisting of SnF$_2$ and deionized water, treating Sn$^{2+}$ sensitized surface in absence of oxygen with an aqueous activating solution of Pd$^{2+}$ ions to deposit a catalytic layer on the sensitized surface, said activating solution comprising from 2 to 10 g/L of PdCl$_2$ and from greater than 0.01 to less than 0.1 M HCl.

treating the activated surface by immersion into an electroless nickel plating solution to deposit a layer comprising nickel, and optionally, treating the nickel-plated surface with a gold-plating solution to deposit a layer comprising gold in a thickness sufficient to protect the nickel deposit from oxidation.

2. The method of claim 1, in which the SnF$_2$ containing sensitizing solution is kept under nitrogen atmosphere prior to, during and after the deposition of Sn$^{2+}$ ions on said surface of the fiber.

3. The method of claim 1, in which the sensitizing solution, the Sn$^{2+}$ sensitized surface of the fiber and the activating solution are kept under the nitrogen atmosphere prior to and during the deposition of the catalytic Pd-coating on the Sn$^{2+}$ sensitized surface.

4. The method of claim 1, in which said sensitizing solution is prepared by dissolving crystalline SnF$_2$ in deionized water.

5. The method of claim 1, in which said sensitizing solution comprises from 0.5 to 3 g/L of SnF$_2$.

6. The method of claim 5, in which said sensitizing solution comprises 1 g/L of SnF$_2$.

7. The method of claim 1, in which HCl concentration in the activating solution ranges from that which is just above that amount of HCl which is insufficient to combine with all of the PdCl$_2$ in the solution to that equal to twice the PdCl$_2$ concentration in the solution.

8. The method of claim 1, in which said activating solution comprises 6 g/L of PdCl$_2$ and from 0.02 to 0.05 M HCl in water.

* * * * *